United States Patent [19]

Foënard

[11] 4,338,369
[45] Jul. 6, 1982

[54] FLOOR COVERING FOR STABLING

[75] Inventor: Pierre Foënard, Paris, France

[73] Assignee: Societe a Responsabilite Limitee: Societe de Developpement Pour l'Agriculture Sodelvage, Sainte Gauburge, France

[21] Appl. No.: 166,651

[22] Filed: Jul. 7, 1980

[30] Foreign Application Priority Data

May 30, 1980 [FR] France ................................ 80 12061

[51] Int. Cl.³ .............................................. B32B 5/06
[52] U.S. Cl. .................................... 428/235; 428/286; 428/300; 428/301; 156/148; 119/28
[58] Field of Search ............... 428/286, 300, 301, 235; 119/28; 156/148

[56] References Cited

U.S. PATENT DOCUMENTS 3,461,844 8/1969 Harrison ............................... 119/28
3,937,861 2/1976 Zuckerman ......................... 428/300

FOREIGN PATENT DOCUMENTS 1091137 11/1967 United Kingdom ............... 428/300
1138159 12/1968 United Kingdom ............... 156/148
 646000 2/1979 U.S.S.R. ............................. 428/300

Primary Examiner—Roland E. Martin, Jr.
Attorney, Agent, or Firm—Roland Plottel

[57] ABSTRACT

A mat for use as bedding material in an animal stall, comprises at least two felt-like layers of textile material (1,2) held together by multiple needle perforations (9) with the top surface of the top layer of textile material being impregnated with a substance (4) suitable for forming an abrasion-resisting skin. The impregnating substance is preferably a heat shrinkable copolymer of styrene and acrylic ether. Natural or synthetic fibers may be used for the felt-like layers of textile material. The fibres may be long and continuous, or alternatively they may be a tangle of short fibres. Although particularly intended for use with stalled cows, the floor covering may be used in other forms of stabling, with other species of animal, and indeed in quite other locations such as public halls and the like.

7 Claims, 3 Drawing Figures

FLOOR COVERING FOR STABLING

BACKGROUND TO THE INVENTION

Since time immemorial straw has been used as bedding for domestic animals, and once soiled it has been used as manure.

These days straw is becoming relatively expensive and a regular supply is becoming difficult to obtain, particularly for those who keep animals but do not grow their own straw.

Further, the use of straw as bedding, even by farmers who grow their own, requires the use of special straw-handling equipment, (e.g. bailers) and storage locations (e.g. barns) together with the labour for collecting and storing the straw at harvest time and for frequent straw-handling throughout the year, i.e. mucking-out and laying new bedding.

The recent increases in the price of oil and its derivatives have led to projects for using straw for other uses, in particular as animal food, as heating fuel, and as raw material for synthesizing alcohol.

One proposal for overcoming these drawbacks has been to house animals in individual stalls known as "cubicals" or "cow-kennels" in which the floor is either a mud floor, or a wooden grating, or brick laid directly on earth, or concrete, and which are so arranged that a standing animal defecates (and urinates if female) directly into a gully provided beyond the end of that part of the floor which is occupied by the animal when lying down.

Unfortunately, mud floors, particularly in chalky ground, wear away locally, leaving holes which require constant attention and which are not always easy to fill in.

Wooden gratings or "duckboards" are hard for lying on, fairly expensive, and further they interfere with the flow of water when washing down.

Brick and concrete floors are not only hard, they are also cold.

Furthermore, such floors still require the use of some straw, albeit in reduced quantities, and they also have the drawback of encouraging various ailments in the animals using them, in particular their joints often become sprained, wrenched, deformed, rheumatic, or arthritic.

Proper use of a floor covering in accordance with the present invention greatly reduces the incidence of such damage, and overcomes the other drawbacks outlined above as well. Furthermore, it is easy to install and keep clean, and offers a high resistance to wear from animal hooves, thereby ensuring a long useful life and relatively low cost.

BRIEF DESCRIPTION OF THE INVENTION

The present invention provides floor covering for stabling, the floor covering comprising at least two layers of textile material held together by multiple needle perforations, one of said layers being a top layer and another being a bottom layer, the top surface of the said top layer being impregnated with a substance suitable for forming a skin having a high degree of resistance to abrasion.

BRIEF DESCRIPTION OF THE DRAWINGS

Other characteristics and advantages of the invention will appear from the following description given by way of example only with reference to the accompanying drawing in which.

DETAILED DESCRIPTION OF PREFERRED EMBODIMENTS

Figure 1:
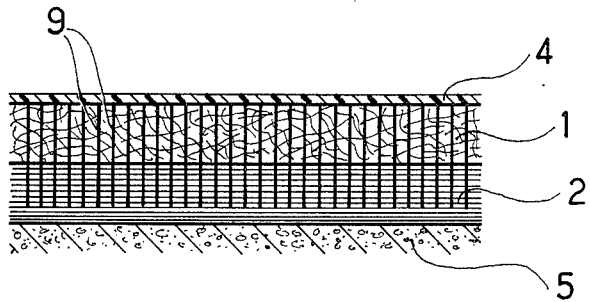
FIG. 1 is a cross-section through a first embodiment of floor covering in accordance with the invention.

With reference to FIG. 1, a floor covering, or mat, for stabling in accordance with the invention comprises two layers 1 and 2 of felt-like textile material held together by multiple needle perforations represented by vertical lines 9. No thread is required since the act of perforation provides sufficient intermingling of the fibres in the two layers to hold the layers together quite firmly.

The felt-like layers of textile material are of the "non-woven" type, which is available in two major varieties which are made respectively from a tangle of short fibres or from continuous long fibres. In the floor covering shown in FIG. 1, the top layer 1 of textile material is made from a tangle of short fibres, while the bottom layer 2 is made from continuous long fibres.

Such felt-like materials can be manufactured by several different methods, including the wet method, the dry method, and extrusion of synthetic fibres constituted by polyamides, polyesters, polyolefins, and particularly polyethylene. Natural fibres may likewise be used either on their own or mixed with synthetic fibres. It is important that natural fibres, if used, are treated to avoid rotting, and preferred sources of natural fibres are wool or cotton waste.

The top surface of the top layer 1 is impregnated with a substance suitable for constituting an abrasion resistant skin 4. This substance, may, for example, comprise a heat shrinkable copolymer of styrene and acrylic ether which is applied under pressure to the top surface of the layer 1, in such a manner that it penetrates a short distance into the layer of felt-like textile material. In places it may penetrate some of the perforations and it may even reach the bottom but overall it penetrates only by a millimeter or so. After setting, it constitutes a porous skin which is highly resistant to abrasion by animal hooves.

The skin-forming substance should be applied at a rate of about 500 to 1000 gm per square meter of floor covering. The substance may be coloured, e.g. using a green pigment.

A floor covering made as described above, is intended to be fixed by any appropriate means to a floor 5; with the bottom layer 2 of the floor covering being directly in contact with the floor. It is also possible to lay the floor covering over a layer of some suitable under-lay, however, to do so complicates and increases the expense of the laying operation, and is not usually necessary.

Figure 2:
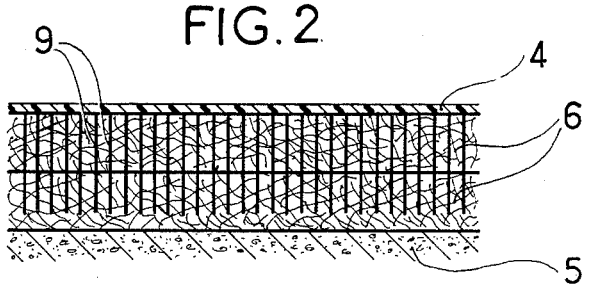
FIG. 2 is a cross-section through a second embodiment of floor covering in accordance with the invention.
Figure 3:
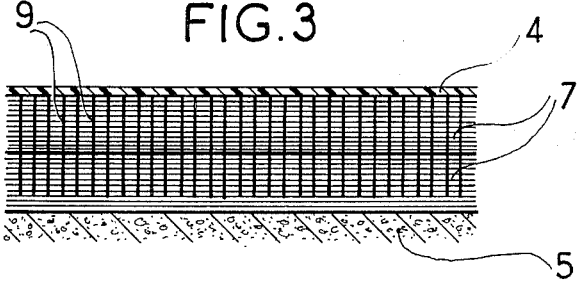
FIG. 3 is a cross-section through a third embodiment of floor covering in accordance with the invention.

Although FIG. 1 shows the floor covering to comprise a top layer 1 made from a tangle of short fibres and a bottom layer 2 made from continuous long fibres, other combinations are, of course, possible. In particular, FIG. 2 shows both layers as being made from respective tangles of short fibres 6, and FIG. 3 shows both layers being made from respective sets of continuous long fibres 7. Further, although all the figures show a two-layer configuration, additional layers could be included, with all the layers being held together by the multiple needle perforations.

Naturally, it is always the top surface of the top layer which is impregnated with an abrasion-resistant, skin-forming substance.

Preferred manufacturing details of the floor covering shown in FIG. 1 are as follows:

The top layer is made from a tangle of short fibres. It is about 10 mm thick.

The bottom layer 2 is made from continuous long fibres. It's thickness is likewise about 10 mm.

The two layers are held together by multiple needle perforations at a density of 100 to 120 perforations per cm$^2$.

The top surface is impregnated with the above-mentioned copolymer at a rate of 700 gm per meter square.

The pressure applied for impregnation results in a total covering thickness of little more than 10 mm; and The weight of the floor covering is about 2.7 kg per m$^2$.

The main advantages of the floor covering in accordance with the invention are as follows:

Firstly the abrasion-resistant skin 4 provides long-term protection against damage to the floor covering by animal hooves. Further, since it takes the shape of the top surface of the layer in which it is impregnated, the skin provides a rough, substantially non-slip surface for an animal to walk and stand on.

Secondly, the floor covering provides excellent thermal insulation between the animal and the floor. This is provided in the main by the air trapped in the layers of felt-like material. If an under-lay of some sort is used, it is preferable, from the point of view of animal comfort, to use a layer of foam rubber thereby providing softer and springier bedding for the animal.

Thirdly, the floor covering will not rot and is easy to clean using a jet of water. The floor covering is immune to chemical attack from the usual agricultural disinfectants, such as bleach, formaldehyde, soda, etc. Thus occasional cleaning of its under-side with disinfectant is sufficient to ensure that bacteria do not proliferate on the under-side of the floor covering. Further, since air can circulate between the fibres of various layers, and since the skin is porous, the inside of the floor covering tends to remain dry enough to be inimical to bacteria. This is particularly true of floor covering used in stalls in which female animals (particularly cows) are constrained to stand further back in their stall than the position they occupy therein when lying down. This ensures that they defecate and urinate into a gully provided beyond the end of the floor covering. Such stalls are sometimes known as "cubicals" or "cow-kennels".

Fourthly, the floor covering is easy to lay on a gently sloping floor (say 1 or 2 in 100) by numerous techniques including nailing, glueing, stapling, etc.

Fifthly, the technique of assembling a plurality of layers of felt-like material means that a floor covering of thickness and consistency suitable for animal comfort can readily be built up from layers of felt-like material of thickness and consistency suitable for ease of manufacture.

Finally, the use of a floor covering in accordance with the invention leads to improved animal health, and hence improves productivity, both for milk production and for meat production.

Although the present invention has been particularly described for use with female animals in a particular kind of stall, it will be readily appreciated that the floor covering can also be used with male animals and with animals of either sex in other kinds of stabling, in particular, it is applicable to stables for horses and cattle, to loose boxes for horses, to pigsties, and to kennels for dogs or other small domestic animals.

The floor covering could also be used in public places subject to wear from a great number of pedestrians, for example: sports halls and stadiums, public halls, railway stations, airports, etc.

I claim:

1. Floor covering for stabling, the floor covering comprising at least two layers of textile material held together by multiple needle perforations, one of said layers being a top layer and another being a bottom layer, the top surface of the said top layer being impregnated with a substance suitable for forming a porous skin having a high degree of resistance to abrasion wherein the said impregnating substance comprises a heat shrinkable copolymer of styrene and acrylic ether and is impregnated into the said top surface in an amount lying between 500 gm and 1000 gm of impregnating substance per square meter of top surface.

2. A floor covering according to claim 1, wherein at least one of the said layers of textile material is made from a tangle of short fibres, and at least one of the other layers is made from continuous long fibres.

3. A floor covering according to claim 1, wherein each of the said layers of textile material is made from a tangle of short fibres.

4. A floor covering according to claim 1, wherein each of the said layers of textile material is made from continuous long fibres.

5. A floor covering according to claim 1, wherein the said textile material is made from synthetic fibres selected from the group consisting of polyamides, polyesters and polyolefins.

6. A floor covering according to claim 1, wherein the said textile material is made from natural fibres that have been treated to prevent rotting and which are selected from the group consisting of wool and cotton.

7. A floor covering according to claim 1, wherein the said textile material comprises a mixture of synthetic fibres and natural fibres.

* * * * *